M. E. TOWLER.
COLLAR SUPPORT.
APPLICATION FILED APR. 23, 1912.
1,102,823.
Patented July 7, 1914.
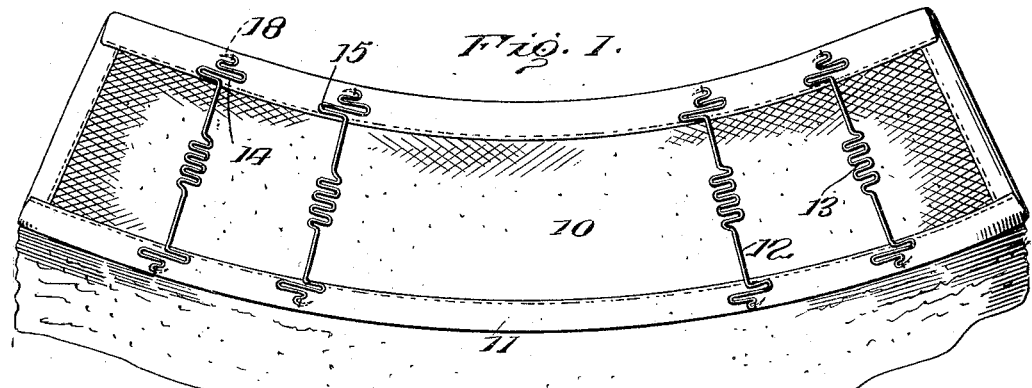
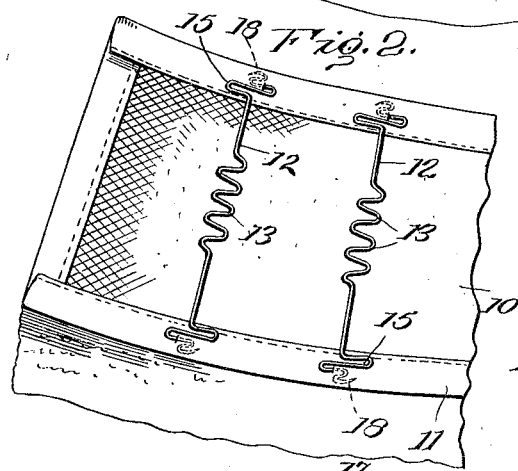
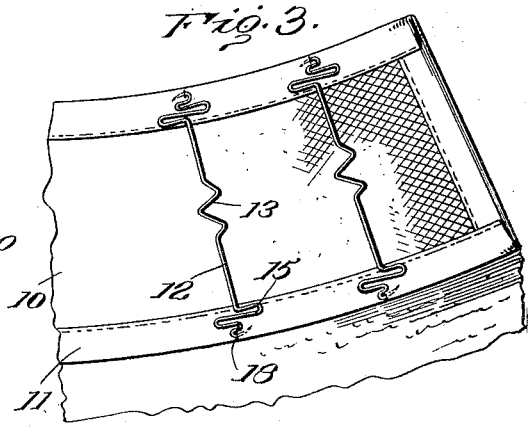
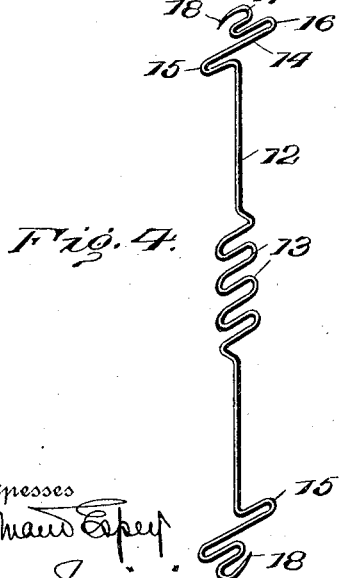
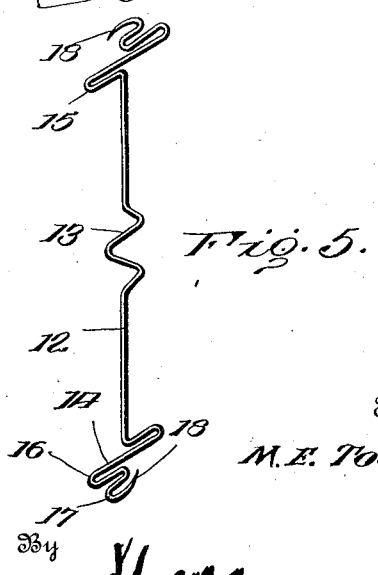
Inventor
M. E. Towler.
By
Attorneys.

UNITED STATES PATENT OFFICE.

MARY E. TOWLER, OF HUBBARD, TEXAS.

COLLAR-SUPPORT.

1,102,823.  Specification of Letters Patent.  Patented July 7, 1914.

Application filed April 23, 1912. Serial No. 692,749.

*To all whom it may concern:*

Be it known that I, MARY E. TOWLER, citizen of the United States, residing at Hubbard, in the county of Hill and State of Texas, have invented certain new and useful Improvements in Collar-Supports, of which the following is a specification.

My invention relates to improvements in collar supporters for use in connection with ladies' collars, and the object of my invention is to provide a supporter which may be readily pinned to the collar and which is therefore easily detached therefrom when desired.

A further object of my invention is to provide a supporter which will extend transversely of the collar to prevent the same from wrinkling when in use.

A further object of my invention is to provide a supporter which will be yielding but which at the same time will be sufficiently rigid to effectively support the collar.

With these and other objects in view, my invention will be more fully described, illustrated in the accompanying drawing, and then specifically pointed out in the claims which are attached to and form a part of this application.

In the drawing: Figure 1 is an elevation of the inner side of a collar, showing my collar supporters applied thereto; Fig. 2 is a fragmentary view, showing a slightly different manner of application as well as a slightly different form of construction; Fig. 3 is a fragmentary elevation, showing a modified form of supporter in operation; Fig. 4 is a perspective view of the preferred form of my invention; Fig. 5 is a perspective view of the form shown in Fig. 3.

Corresponding and like parts are referred to in the following description and indicated in all the views of the accompanying drawing by the same reference characters.

My invention consists primarily of a resilient body member, preferably formed of wire and terminating at its ends in pin fastening devices by means of which the supporter may be attached to the collar and for the sake of clearness I have illustrated my device as applied to a conventional form of ladies' collar designated by the numeral 10 and provided about its edges with an inturned hem 11, the hem giving a finished appearance to the collar and at the same time serving as a means for attaching the supporters, as will be hereinafter explained.

The preferred form of collar supporter, namely that shown in Figs. 1 and 4 of the drawing, is preferably formed from a single piece of resilient wire 12 bent intermediate its length to form a plurality of spaced loops 13 and having its end portions oppositely directed from the terminal loops in alinement with each other and terminating in pin fastening devices designated as a whole by the numeral 14. As shown, the loops are oppositely formed and lie in the same plane with the oppositely extending ends of the wire and with the pin fastening devices, the side portions of the loop extending in parallel spaced relation at right angles to the extended portions, while the bite portions of the loops are rounded, as shown.

The pin fastening devices are formed integrally with the body of the supporter, the free ends of the wire of which the body is formed, in each case being bent at right angles to the body and re-bent to extend transversely of the body and the space beyond the end of the same forming a loop 15. The transverse portion of the wire is then re-bent upon itself to form an oppositely directed loop 16, after which the wire is bent outwardly at a point immediately opposite the end of the body member and back upon itself to form the loop 17, the terminal of this loop being directed downwardly toward the transverse portion of the fastener connecting the loops 15 and 16 and pointed for engagement in the fabric of the collar. The various loops going to make these fasteners are formed in the plane of the loops 13 and in such a manner that the pointed terminals 18 are oppositely directed from each other.

The collar supporter is secured in place against the inner face of the collar by inserting the pointed terminal 18 of one end of the supporter through the inner thickness of the upper hem of the collar and by inserting the corresponding terminal at the other end into the inner thickness of the lower hem of the collar. As these pointed terminals are oppositely directed, it is possible to insert both terminals at once by properly positioning their pointed ends and then partially rotating the body member, as will be clearly understood from the drawing. If, for any reason a more firm securing of the supporter in place is desired, the loop 17 may be forced through the inner layer of fabric and the body member rerotated to detach the pin as shown in Fig. 2 of the drawing.

The modified form of supporter shown in Fig. 2 is identical in construction with that shown in Figs. 1 and 4 with the exception that the side portions of the intermediate loops 13 extend at an angle to each other, this construction giving slightly more stiffness to the body of the fastener.

The modified form shown in Figs. 3 and 5 shows a still different looped formation, the sides of the loop being extended at still greater angles to each other.

The intermediate loops 13 give added resiliency to the supporter and also form an enlarged bearing face which engages against the inner face of the collar and prevents the supporter from turning. The loops formed at the upper and lower ends of the supporter give added resiliency to the terminal portions of the supporter, permit the more ready fastening of the supporter and absolutely prevent the points of the fasteners from turning inwardly.

It will of course be understood that the device may be made of any preferred metal and plated if desired.

From the foregoing description, taken in connection with the drawing, the application and use of the device will be readily understood and any description of the same is therefore unnecessary.

Having thus described the invention, what is claimed as new is:

1. A collar supporter formed from a single length of resilient wire having its intermediate portion bent to form a plurality of superposed transversely disposed loops and its opposite ends bent to form single transverse loops of greater length than the intermediate loops, the wire after the single loops are formed being bent in a horizontal plane to produce terminal hooks the bills of which are extended in opposite directions and sharpened.

2. A collar supporter formed from a single length of resilient wire having its intermediate portion bent to produce expansible loops, the wire after the loops are formed being extended in a substantially straight line and thence bent laterally upon itself to form terminal transversely disposed single loops, the wire constituting the end of each single loop being bent to produce a horizontally disposed hook, the bills of said hooks being extended in opposite directions and sharpened.

3. A collar supporter comprising a resilient body portion formed of a single length of metal free to expand in the direction of its length and provided with terminal substantially S-shaped hooks the bills of which are extended horizontally in opposite directions and provided with piercing points.

In testimony whereof I affix my signature in presence of two witnesses.

Mrs. MARY E. TOWLER. [L. S.]

Witnesses:
M. L. OUSTAD,
G. C. CUNNINGHAM.

---

Copies of this patent may be obtained for five cents each, by addressing the "Commissioner of Patents, Washington, D. C."